US011776563B2

(12) United States Patent
Wang

(10) Patent No.: US 11,776,563 B2
(45) Date of Patent: *Oct. 3, 2023

(54) TEXTUAL ECHO CANCELLATION

(71) Applicant: Google LLC

(72) Inventor: Quan Wang, Hoboken, NJ (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/045,168

(22) Filed: Oct. 9, 2022

(65) Prior Publication Data

US 2023/0114386 A1   Apr. 13, 2023

Related U.S. Application Data

(63) Continuation of application No. 17/199,347, filed on Mar. 11, 2021, now Pat. No. 11,482,244.

(60) Provisional application No. 63/037,137, filed on Jun. 10, 2020.

(51) Int. Cl.
| | |
|---|---|
| *G10L 21/02* | (2013.01) |
| *G10L 25/30* | (2013.01) |
| *G10L 21/0208* | (2013.01) |
| *G10L 25/93* | (2013.01) |
| *G10L 13/00* | (2006.01) |
| *G10L 15/06* | (2013.01) |

(52) U.S. Cl.
CPC ............ *G10L 25/93* (2013.01); *G10L 13/00* (2013.01); *G10L 15/063* (2013.01); *G10L 21/02* (2013.01); *G10L 21/0208* (2013.01); *G10L 25/30* (2013.01); *G10L 2021/02082* (2013.01)

(58) Field of Classification Search
CPC ..................... G10L 21/02; G10L 25/30; G10L 2021/02082
See application file for complete search history.

(56) References Cited

U.S. PATENT DOCUMENTS

| | | | |
|---|---|---|---|
| 9,324,322 | B1 | 4/2016 | Torok et al. |
| 10,134,421 | B1 | 11/2018 | Sundaram |
| 2015/0235637 | A1 | 8/2015 | Casado et al. |
| 2019/0122685 | A1 | 4/2019 | Defraene et al. |

FOREIGN PATENT DOCUMENTS

EP          3474280 A1      4/2019

OTHER PUBLICATIONS

International Search Report, Application No. PCT/US2021/022008, dated May 19, 2021, 14 pages.

(Continued)

*Primary Examiner* — Bryan S Blankenagel
(74) *Attorney, Agent, or Firm* — Honigman LLP; Brett A. Krueger; Grant J. Griffith

(57) ABSTRACT

A method includes receiving an overlapped audio signal that includes audio spoken by a speaker that overlaps a segment of synthesized playback audio. The method also includes encoding a sequence of characters that correspond to the synthesized playback audio into a text embedding representation. For each character in the sequence of characters, the method also includes generating a respective cancelation probability using the text embedding representation. The cancelation probability indicates a likelihood that the corresponding character is associated with the segment of the synthesized playback audio overlapped by the audio spoken by the speaker in the overlapped audio signal.

20 Claims, 9 Drawing Sheets

(56) References Cited

OTHER PUBLICATIONS

Ding et al., "Textual Echo Cancellation," Nov. 3, 2020, 8 pages.
Fazel et al., "CAD-AEC: Context-Aware Deep Acoustic Echo Cancellation," May 4, 2020, 5 pages.
Wang et al., "Voicefilter: Targeted Voice Separation by Speaker-Conditioned Spectrogram Masking," Jun. 19, 2019, 5 pages.
Indian Examination Report for the related Application No. 202227065794 dated Feb. 9, 2023, 6 pages.

US 11,776,563 B2

TEXTUAL ECHO CANCELLATION

CROSS REFERENCE TO RELATED APPLICATIONS

This U.S. patent application is a continuation of, and claims priority under 35 U.S.C. § 120 from, U.S. patent application Ser. No. 17/199,347, filed on Mar. 11, 2021, which claims priority under 35 U.S.C. § 119(e) to U.S. Provisional Application 63/037,137, filed on Jun. 10, 2020. The disclosures of these prior applications are considered part of the disclosure of this application and are hereby incorporated by reference in their entireties.

TECHNICAL FIELD

This disclosure relates to textual echo cancelation.

BACKGROUND

As audio systems capture and transmit audio, these peripheral devices may be subject to echo. Echo generally occurs when an audible signal generated from an audio playout device (e.g., a speaker) propagates in the form of an acoustic wave through an acoustic environment (e.g., air) and a modified version of the wave reflects back into a microphone. Another form of echo is electrical echo, which takes place because of undesired electrical coupling effects between the audio playout device (e.g., a speaker) and the microphone. The signal generated by such echo paths then becomes transmitted as an audio echo. Echoes may result due to various factors, such as, for example, a proximity of peripherals or a quality of peripherals. As echo occurs within a speech-enabled environment where one or more devices are performing speech processing, the echo may have detrimental effects on the accuracy of the speech processing; thus affecting a user's experience with the device and/or speech system. As people increasingly communicate using systems subjected to echo, echo cancelation systems and methods may be implemented to improve the quality of speech processing impacted by echo.

SUMMARY

One aspect of the disclosure provides a computer-implemented method that when executed on data processing hardware causes the data processing hardware to perform operations that include receiving an overlapped audio signal that includes audio spoken by a speaker that overlaps a segment of synthesized playback audio, and encoding a sequence of characters that correspond to the synthesized playback audio into a text embedding representation. The operations also include generating, for each character in the sequence of characters, using the text embedding representation, a respective cancelation probability and generating, using a cancelation neural network configured to receive the overlapped audio signal and the respective cancelation probability generated for each character in the sequence of characters as inputs, an enhanced audio signal by removing the segment of the synthesized playback audio from the overlapped audio signal. Each respective cancelation probability indicates a likelihood that the corresponding character is associated with the segment of the synthesized playback audio overlapped by the audio spoken by the speaker in the overlapped audio signal.

Implementations of the disclosure may include one or more of the following optional features. In some implementations, encoding the sequence of characters includes encoding each character in the sequence of characters into a corresponding character embedding to generate a sequence of character embeddings. In these implementations, that overlapped audio signal may include a sequence of frames and generating the respective cancelation probability for each character in the sequence of characters may include using an attention mechanism to apply a weight to the corresponding character embedding when the corresponding character embedding corresponds to one of the frames in the sequence of frames of the overlapped audio signal. Each frame in the sequence of frames corresponds to a portion of the audio spoken by the speaker that overlaps the segment of synthesized playback audio.

A text-to-speech (TTS) system may the sequence of characters into synthesized speech comprising the synthesized playback audio. Optionally, the text embedding representation may include a single, fixed-dimensional text embedding vector. In some examples, a text encoder of a text encoding neural network encodes the sequence of characters that correspond to the synthesized playback audio into the text embedding representation. In these examples, the text encoder may be shared by the TTS system that is configured to generate the synthesized playback audio from the sequence of characters.

In some implementations, the operations further include training the cancelation neural network on a plurality of training examples, wherein each training example includes a ground truth audio signal corresponding to non-synthesized speech, a training overlapped audio signal comprising the ground truth audio signal overlapping a synthesized audio signal, and a respective textual representation of the synthesized audio signal. Here, the textual representation includes a sequence of characters.

The cancelation neural network may include a Long Short Term Memory (LSTM) network with a plurality of LSTM layers. The operations may further include receiving an indication that a textual representation of the synthesized playback audio is available.

Another aspect of the disclosure provides a system that includes data processing hardware and memory hardware in communication with the data processing hardware. The memory hardware stores instructions that when executed by the data processing hardware causes the data processing hardware to perform operations that include receiving an overlapped audio signal that includes audio spoken by a speaker that overlaps a segment of synthesized playback audio, and encoding a sequence of characters that correspond to the synthesized playback audio into a text embedding representation. The operations also include generating, for each character in the sequence of characters, using the text embedding representation, a respective cancelation probability and generating, using a cancelation neural network configured to receive the overlapped audio signal and the respective cancelation probability generated for each character in the sequence of characters as inputs, an enhanced audio signal by removing the segment of the synthesized playback audio from the overlapped audio signal. Each respective cancelation probability indicates a likelihood that the corresponding character is associated with the segment of the synthesized playback audio overlapped by the audio spoken by the speaker in the overlapped audio signal.

This aspect may include one or more of the following optional features. In some implementations, encoding the sequence of characters includes encoding each character in the sequence of characters into a corresponding character embedding to generate a sequence of character embeddings. In these implementations, that overlapped audio signal may include a sequence of frames and generating the respective cancelation probability for each character in the sequence of characters may include using an attention mechanism to apply a weight to the corresponding character embedding when the corresponding character embedding corresponds to one of the frames in the sequence of frames of the overlapped audio signal. Each frame in the sequence of frames corresponds to a portion of the audio spoken by the speaker that overlaps the segment of synthesized playback audio.

A text-to-speech (TTS) system may the sequence of characters into synthesized speech comprising the synthesized playback audio. Optionally, the text embedding representation may include a single, fixed-dimensional text embedding vector. In some examples, a text encoder of a text encoding neural network encodes the sequence of characters that correspond to the synthesized playback audio into the text embedding representation. In these examples, the text encoder may be shared by the TTS system that is configured to generate the synthesized playback audio from the sequence of characters.

In some implementations, the operations further include training the cancelation neural network on a plurality of training examples, wherein each training example includes a ground truth audio signal corresponding to non-synthesized speech, a training overlapped audio signal comprising the ground truth audio signal overlapping a synthesized audio signal, and a respective textual representation of the synthesized audio signal. Here, the textual representation includes a sequence of characters.

The cancelation neural network may include a Long Short Term Memory (LSTM) network with a plurality of LSTM layers. The operations may further include receiving an indication that a textual representation of the synthesized playback audio is available.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
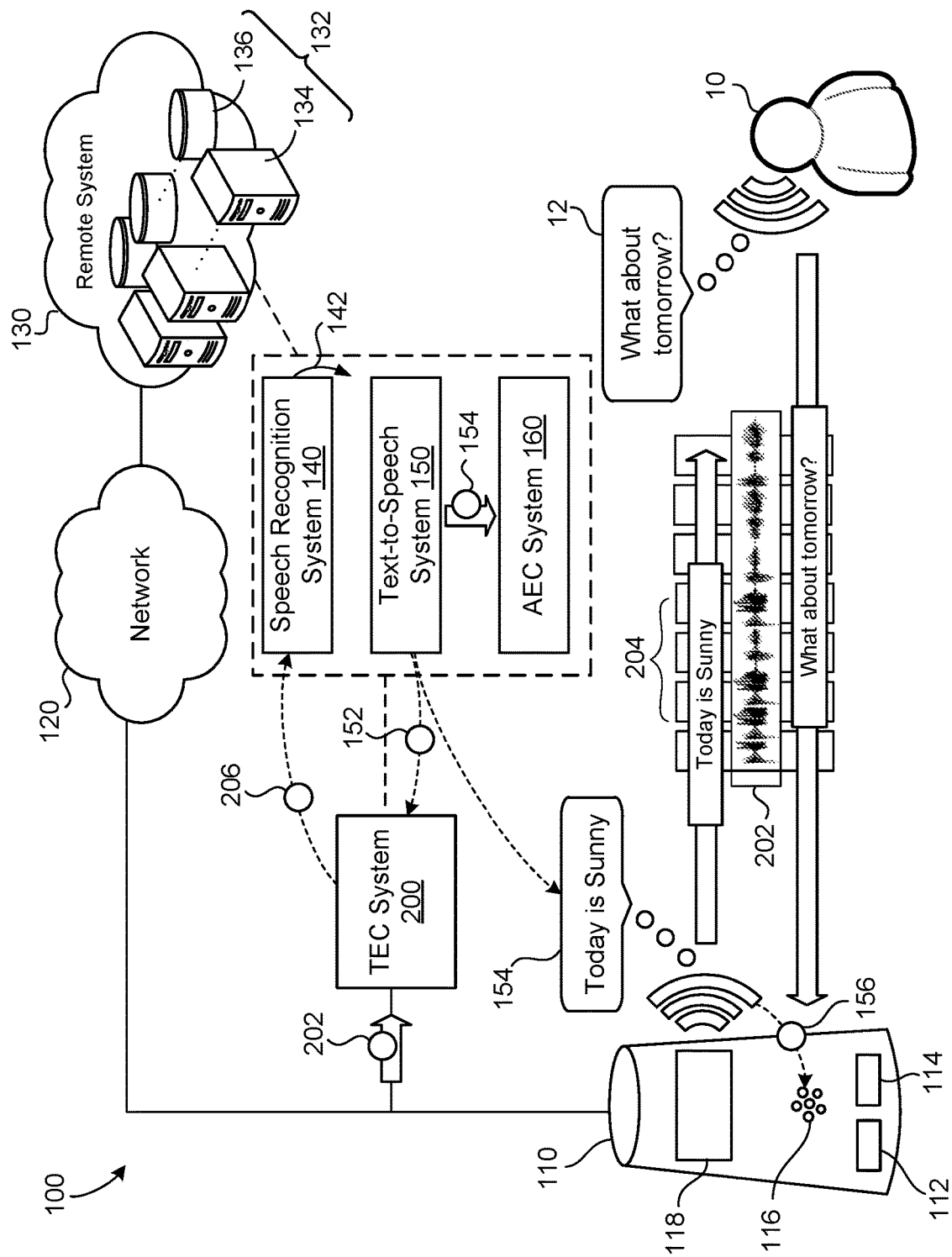
FIG. 1 is a schematic view of an example speech environment.

Speech-enabled devices are capable of generating synthesized playback audio and communicating the synthesized playback audio to one or more users within a speech environment. Here, synthesized playback audio refers to audio generated by the speech-enabled device that originates from the speech-enabled device itself or machine processing systems associated with the speech-enabled device rather a person or other source of audible sound external to the speech-enabled device. Generally speaking, the speech-enabled device generates synthesized playback audio using a text-to-speech (TTS) system. A TTS system converts text to an audio representation of the text where the audio representation of the text is modeled to be like that of a spoken utterance using human language.

While an audio output component (e.g., a speaker) of the speech-enabled device outputs the synthesized playback audio, an audio capturing component (e.g., a microphone) of the speech-enabled device may still be actively capturing audible sound (i.e., listening) within the speech environment. This means that some portion of synthesized playback audio output from the speaker will be received at the audio capturing component as a form of echo. Unfortunately, with this form of echo from the synthesized playback audio, it may be difficult for a speech recognizer implemented at the speech-enabled device, or implemented at a remote system in communication with the speech-enabled device, to understand spoken utterances occurring during the echo from the synthesized playback audio. In other words, a speech-enabled device often generates synthesized playback audio as a response to a query or command from a user of the speech-enabled device. For instance, the user may ask the speech-enabled device, "what will the weather be like today?" When the speech-enabled device receives this query or question from the user, the speech-enabled device or remote system in communication with the speech-enabled device initially has to determine or process the spoken utterance from the user. By processing the spoken utterance, the speech-enabled device is able to recognize that the spoken utterance corresponds to a query from the user (e.g., regarding the weather) and that, as a query, the user anticipates a response from the speech-enabled device.

Typically, the speech-enabled device uses a speech recognition system (e.g., an automatic speech recognition (ASR) system) to determine the context of the spoken utterance. The speech recognition system receives an audio signal or audio data and generates a transcript of text representing the characters, words, and/or sentences spoken in the audio signal. Speech recognition, however, may become more complicated when the speech capturing component of the speech-enabled device receives echo and/or distortion at the same time as all or part of one or more utterances spoken by the user(s) to the speech-enabled device. For instance, one or more microphones of the speech-enabled device are fed some portion of the synthesized playback audio signal as echo or acoustic feedback. The echo from the synthesized playback audio combined with one or more spoken utterances results in the speech-enabled device receiving an audio signal with overlapping speech. Here, the overlapping speech refers to an instance in the audio signal where the echo signal from the synthesized playback audio occurs at the same time (i.e., simultaneous or concurrently) as the one or more spoken utterances. When this overlapping speech occurs, the speech recognition system may have a difficult time processing the audio signal received at the speech-enabled device. That is, the overlapping speech may compromise the speech recognition system's ability to generate an accurate transcript for the one or more spoken utterances. Without an accurate transcript from the speech recognition system, the speech-enabled device may fail to accurately respond or respond at all to a query or a command from a spoken utterance by the user. Alternatively, the speech-enabled device may want to avoid using its processing resources attempting to interpret audible sound that is actually echo from the synthesized playback audio signal and/or from the surroundings.

One approach to combat distortion or echo captured by audio capturing components of the speech-enabled device is to use an acoustic echo cancelation (AEC) system. In an AEC system, the AEC system uses an audio signal to cancel the echo related to the synthesized playback audio signal. For instance, in some configurations, the AEC system includes a neural network that learns from audio signal examples (e.g., examples of synthesized playback audio signals) how to cancel echo from the synthesized playback audio signal. Although this approach is generally successful at canceling echo, an AEC system may not be the most resource efficient approach. In other words, in order to cancel the echo for the synthesized playback audio signal, the AEC system is sent the synthesized playback audio signal that will be output by the audio output component of the speech-enabled device. Unfortunately, the synthesized playback audio signal, as an audio file, is often a relatively large file size. As a relatively large file size, communicating the synthesized playback audio signal between systems of the speech-enabled device introduces potential performance issues such as latency. Moreover, communicating and processing a relatively large file size may tax processing resources of the speech-enabled device. To exacerbate these potential issues, the AEC system may reside remotely on a network server instead of on-device. For instance, when speech recognition is performed as a service, acoustic echo cancelation requires sending the synthetized playback audio from a TTS system as a side input to a server hosting the speech recognition system. With an AEC system and/or TTS system residing on a remote system, audio files may be need to transferred between the speech-enabled device and the remote system one or more times subjecting the process to the potential for latency or other transmission issues.

Another approach that may be employed by speech-enabled devices to remove unwanted echo is a filtering system. In a filtering system, the filtering system learns voice characteristics of a speaker such that the filtering system is able to filter out components of an audio signal that do not relate to the voice of the speaker. Here, the filtering system requires audio samples of spoken utterances from a target speaker to learn voice characteristics of the target speaker. For instance, the filtering system generates an embedding vector of the target speaker representing the voice characteristics of the target user. The embedding vector may then be subsequently used as an auxiliary input to remove any captured audio signal that does not belong to the target speaker. Yet with a filtering approach, the filtering system requires the generation of the additional auxiliary input of the embedding vector as well as a learning process to develop the embedding vector. Moreover, this approach relies on the target speaker to provide audio samples and a sufficient number of audio samples to accurately learn voice characteristics for the target speaker. Although perhaps effective, these additional inputs may burden the speech-enabled device or systems of the speech-enabled device with additional costs.

To address some of these concerns with echo cancelation, the speech-enabled device may instead use a textual echo cancelation (TEC) system. In a TEC system, in lieu of the echo being canceled using the synthesized playback audio signal that generates the echo, the TEC system cancels the echo using text. Since the synthesized playback audio signal originates from input text (e.g., text of a TTS system), the input text used to generate the synthesized playback audio signal may be used by the TEC system to cancel the echo resulting from the synthesized playback audio signal. Here, by using text, the TEC receives a text file that is smaller in size than a file for an audio signal (e.g., an audio file for the synthesized playback audio signal). For instance, a text file may be on the scale of bytes of data while an audio file is on the scale of kilobytes, megabytes or even larger (e.g., depending on the signal quality). By using a text file smaller in size than an audio signal, this approach may reduce latency since audio signals need not be communicated over the network, while at the same time, avoid expending processing time and/or resources to communicate the text file. Furthermore, the TEC may promote an efficient use of processing resources because the TEC system may utilize text that a system, such as the TTS system, is already generating in order to produce the synthesized playback audio signal. Thus, by using text, the TEC approach may avoid issues arising from an AEC system, such as latency, or a filtering system, such as training and requiring additional inputs.

Referring to FIG. 1, in some implementations, a speech environment 100 includes a user 10 communicating a spoken utterance 12 to a speech-enabled device 110 (also referred to as a device 110 or a user device 110). The user 10 (i.e., speaker of the utterance 12) may speak the utterance 12 as a query or a command to solicit a response from the device 110. The device 110 is configured to capture sounds from one or more users 10 within the speech environment 100. Here, the audio sounds may refer to a spoken utterance 12 by the user 10 that functions as an audible query, a command for the device 110, or an audible communication captured by the device 110. Speech-enabled systems of the device 110 or associated with the device 110 may field the query for the command by answering the query and/or causing the command to be performed.

Here, the device 110 captures an audio signal 202 (also referred to as audio data) of the spoken utterance 12 by the user 10. The device 110 may correspond to any computing device associated with the user 10 and capable of receiving audio signals 202. Some examples of user devices 110 include, but are not limited to, mobile devices (e.g., mobile phones, tablets, laptops, etc.), computers, wearable devices (e.g., smart watches), smart appliances, and internet of things (IoT) devices, smart speakers, etc. The device 110 includes data processing hardware 112 and memory hardware 114 in communication with the data processing hardware 112 and storing instructions, that when executed by the data processing hardware 112, cause the data processing hardware 112 to perform one or more operations. In some examples, the device 110 includes one or more applications (i.e., software applications) where each application may utilize one or more speech processing systems 140, 150, 160, 200 associated with device 110 to perform various functions within the application. For instance, the device 110 includes an assistant application configured to communicate synthesized playback audio 154 to the user 10 to assist the user 10 with various tasks.

The device 110 further includes an audio subsystem with an audio capturing device (e.g., a microphone) 116 for capturing and converting spoken utterances 12 within the speech environment 100 into electrical signals and a speech output device (e.g., a speaker) 118 for communicating an audible audio signal (e.g., a synthesized playback signal 154 from the device 110). While the device 110 implements a single audio capturing device 116 in the example shown, the device 110 may implement an array of audio capturing devices 116 without departing from the scope of the present disclosure, whereby one or more audio capturing devices 116 in the array may not physically reside on the device 110, but be in communication with the audio subsystem (e.g., peripherals of the device 110). For example, the device 110 may correspond to a vehicle infotainment system that leverages an array of microphones positioned throughout the vehicle.

Furthermore, the device 110 is configured to communicate via a network 120 with a remote system 130. The remote system 130 may include remote resources 132, such as remote data processing hardware 134 (e.g., remote servers or CPUs) and/or remote memory hardware 136 (e.g., remote databases or other storage hardware). The device 110 may utilize the remote resources 132 to perform various functionality related to speech processing and/or synthesized playback communication. For instance, the device 110 is configured to perform speech recognition using a speech recognition system 140, conversion of text to speech using a TTS system 150, acoustic echo cancelation using an AEC system 160, and/or textual echo cancelation using a TEC system 200. These systems 140, 150, 160, 200 may reside on the device 110 (referred to as on-device systems) or reside remotely (e.g., reside on the remote system 130), but in communication with the device 110. In some examples, some of these systems 140, 150, 160, 200 reside locally or on-device while others reside remotely. In other words, any of these systems 140, 150, 160, 200 may be local or remote in any combination. For instance, when a system 140, 150, 160, 200 is rather large in size or processing requirements, the system 140, 150, 160, 200 may reside in the remote system 130. Yet when the device 110 may support the size or the processing requirements of one or more systems 140, 150, 160, 200, the one or more systems 140, 150, 160, 200 may reside on the device 110 using the data processing hardware 112 and/or the memory hardware 114. Optionally, the one or more of the systems 140, 150, 160, 200 may reside on both locally/on-device and remotely. For instance, one or more of the systems 140, 150, 160, 200 may default to execute on the remote system 130 when a connection to the network 120 between the device 110 and remote system 130 is available, but when the connection is lost or the network 120 is unavailable, the systems 140, 150, 160, 200 instead execute locally on the device 110.

A speech recognition system 140 receives an audio signal 202 as an input and transcribes that audio signal into a transcription 142 as an output. Generally speaking, by converting the audio signal 202 into a transcription 142, the speech recognition system 140 allows the device 110 to recognize when a spoken utterance 12 from the user 10 corresponds to a query, a command, or some other form of audio communication. The transcription 142 refers to a sequence of text that the device 110 may then use to generate a response to the query or the command. For instance, if the user 10 asks the device 110 the question of "what will the weather be like today," the device 110 passes the audio signal corresponding to the question "what will the weather be like today" to the speech recognition system 140. The speech recognized system 140 converts the audio signal into a transcript that includes the text of "what will the weather be like today?" The device 110 may then determine a response to the query using the text or portions of the text. For instance, in order to determine the weather for the current day (i.e., today), the device 110 passes the text (e.g., "what will the weather be like today?") or identifying portions of the text (e.g., "weather" and "today") to a search engine. The search engine may then return one or more search results that the device 110 interprets to generate a response for the user 10.

In some implementations, the device 110 or a system associated with the device 110 identifies text 152 that the device 110 will communicate to the user 10 as a response to a query of the spoken utterance 12. The device 110 may then use the TTS system 150 to convert the text 152 into corresponding synthesized playback audio 154 for the device 110 to communicate to the user 10 (e.g., audibly communicate to the user 10) as the response to the query of the spoken utterance 12. In other words, the TTS system 150 receives, as input, text 152 and converts the text 152 to an output of synthesized playback audio 154 where the synthesized playback audio 154 is an audio signal defining an audible rendition of the text 152. In some examples, the TTS system 150 includes a text encoder (e.g., the text encoder 210 of FIGS. 2A-2E) that processes the text 152 into an encoded format (e.g., a text embedding). Here, the TTS system 150 may use a trained text-to-speech model to generate the synthesized playback audio 154 from the encoded format of the text 152. Once generated, the TTS system 150 communicates the synthesized playback audio 154 to the device 110 to allow the device 110 to output the synthesized playback audio 154. For instance, the device 110 outputs the synthesized playback audio 154 of "today is sunny" at a speaker 118 of the device 110.

With continued reference to FIG. 1, when the device 110 outputs the synthesized playback audio 154, the synthesized playback audio 154 generates an echo 156 captured by the audio capturing device 116. Unfortunately, in addition to the echo 156, the audio capturing device 116 may also be simultaneously capturing another spoken utterance 12 from the user 10. For example, FIG. 1 depicts that, as the device 110 outputs the synthesized playback audio 154, the user 10 inquires more about the weather, in a spoken utterance 12 to the device 110, by stating "what about tomorrow?" Here, the spoken utterance 12 and the echo 156 are both captured at the audio capturing device 116 simultaneously to form an audio signal 202. In other words, the audio signal 202 includes an overlapped audio signal where some portion of an utterance 12 spoken by the user 12 overlaps with some portion of the synthesized playback audio 154 output from the speaker 118 of the device 110. In FIG. 1, the portion of the utterance 12 and the portion of the synthesized playback audio 154 that overlap with one another in the captured audio signal 202 is shown as the overlapping region 204. With the overlapped audio signal 202, the speech recognition system 140 may have issues recognizing the utterance 12 corresponding to the weather inquiry "what about tomorrow" in the audio signal 202 since the utterance 12 is mixed with the echo 156 of the synthesized playback audio 154 to form the audio signal 202 received at the device 110 (e.g., at the audio capturing device 116).

To prevent such issues, the device 110 may communicate the audio signal 202 to the TEC system 200 prior to the speech recognition system 140 processing the audio signal 202. By communicating the audio signal 202 to the TEC system 200 prior to the speech recognition system 140, the TEC system 200 is configured to generate an enhanced audio signal 206 that removes the echo 156 of the synthesized playback audio 154 or some portion thereof; effectively canceling the echo 156. That is, the enhanced audio signal 206 refers to a modified version of the audio signal 202 that enables the speech recognition system 140 to identify the spoken utterance 12 contained in the audio signal 202. Here, in order to generate the enhanced audio signal 206, the TEC system 200 receives the overlapped audio signal 202 as well as the text 152 corresponding to the synthesized playback audio 154.

In some examples, the device 110 includes an AEC system 160 in conjunction with the TEC system 200. By including both systems 160, 200, the device 110 has the capability to cancel echo regardless of when text is or is not available for the cancelation process. In some of implementations, the device 110 determines whether to use the AEC system 160 based on an indication that a textual representation is available for at least one part of the audio contributing to the audio signal 202. For instance, the device 110 is playing music that generates an echo at audio capturing device 116 at the same time as when the user 10 speaks an utterance 12 to the device 110. In this scenario, there is no text available for the music that is being output by the device 110 and therefore the device 110 identifies no text is available and uses the AEC system 160 to cancel the echo present at the audio capturing device 116. In contrast, FIG. 1 illustrates the device 110 outputting synthesized playback audio 154 where the device 110 or some system associated with the device 110 has already generated text 152 corresponding to the synthesized playback audio 154. In this example, the device 110 uses the TEC system 200 rather than the AEC system 160 to cancel the echo 156 at the audio capturing device 116. Here, the device 110 selects the TEC system 200 rather than the AEC system 160 because the TEC system 200 will likely cancel/remove the echo 156 more quickly based on the smaller text file size involved in the cancelation process at the TEC system 200 in comparison to the larger audio file size involved in the cancelation process at the AEC system 160.

Referring to FIGS. 2A-2D, the TEC system 200 is configured to receive, as inputs, the audio signal 202 that includes the overlapping region 204 and the text 152 (also referred to as a textual representation) that is used to generate the synthesized playback audio 154. With these inputs, the TEC system 200 is configured to generate the enhanced audio signal 206 by removing at least one segment of the synthesized playback audio 154 from the audio signal 202 within the overlapping region 204. In order to perform these operations, the TEC system 200 includes some combination of a text encoder 210, an attention mechanism 220, and a cancelation neural network 230 (also referred to as a network 230). The text encoder 210 may include a text encoder neural network.

Figure 2A:
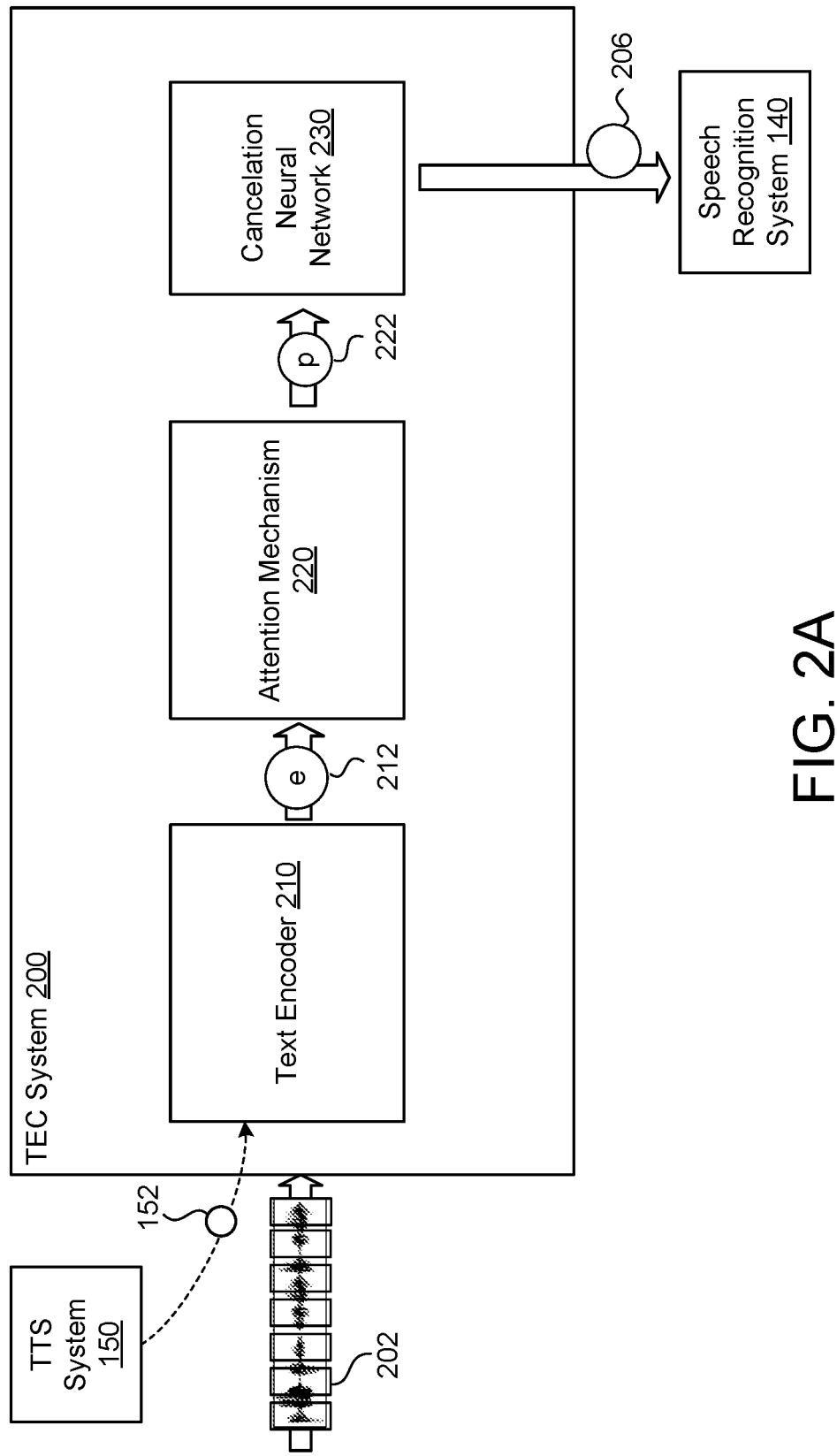
FIGS. 2A-2C are schematic views of example textual echo cancelation systems of the speech environment of FIG. 1.

The text encoder 210 is configured to receive text 152 corresponding to synthesized playback audio 154 and to encode the text 152 into encoded text referred to as a text embedding representation 212 (or simply text embedding 212). The TEC system 200 may include its own text encoder 210 (e.g., as shown in FIG. 2A) or the text encoder 210 may be shared between the TEC 200 and the TTS system 150 (e.g., as shown in FIG. 2D). An embedding generated by the text encoder 210 refers to a mathematical vector of n dimensions representing the text 152 where each dimension may correspond to a feature or characteristic of the text (e.g., a categorical variable). In some implementations, the text encoder 210 encodes the entire text 152 into a single, fixed-dimensional text embedding 212 which represents the synthetic playback audio 152. In other implementations, the text encoder 210 encodes the text 152 into a text embedding sequence where the embedding is not a fixed length, but rather has a length corresponding to a number of characters in the text 152. For example, the text embedding 212 is a sequence of character embeddings 214, 214A-N. With words, or more particularly words of the English language, each word is divided into units of characters referred to as letters. Thus, each character embedding 214 may represent a letter of the text 152 such that each character embedding 214 of the text embedding sequence corresponds to one letter of the twenty-six letter English alphabet. Although the text embedding 212 is described with respect to a twenty-six dimension vector for the English alphabet, the text embedding 212 generated by the text encoder 210 may be any form of embedding that functions with the cancelation neural network 230 to generate the enhanced audio 206.

Figure 2B:
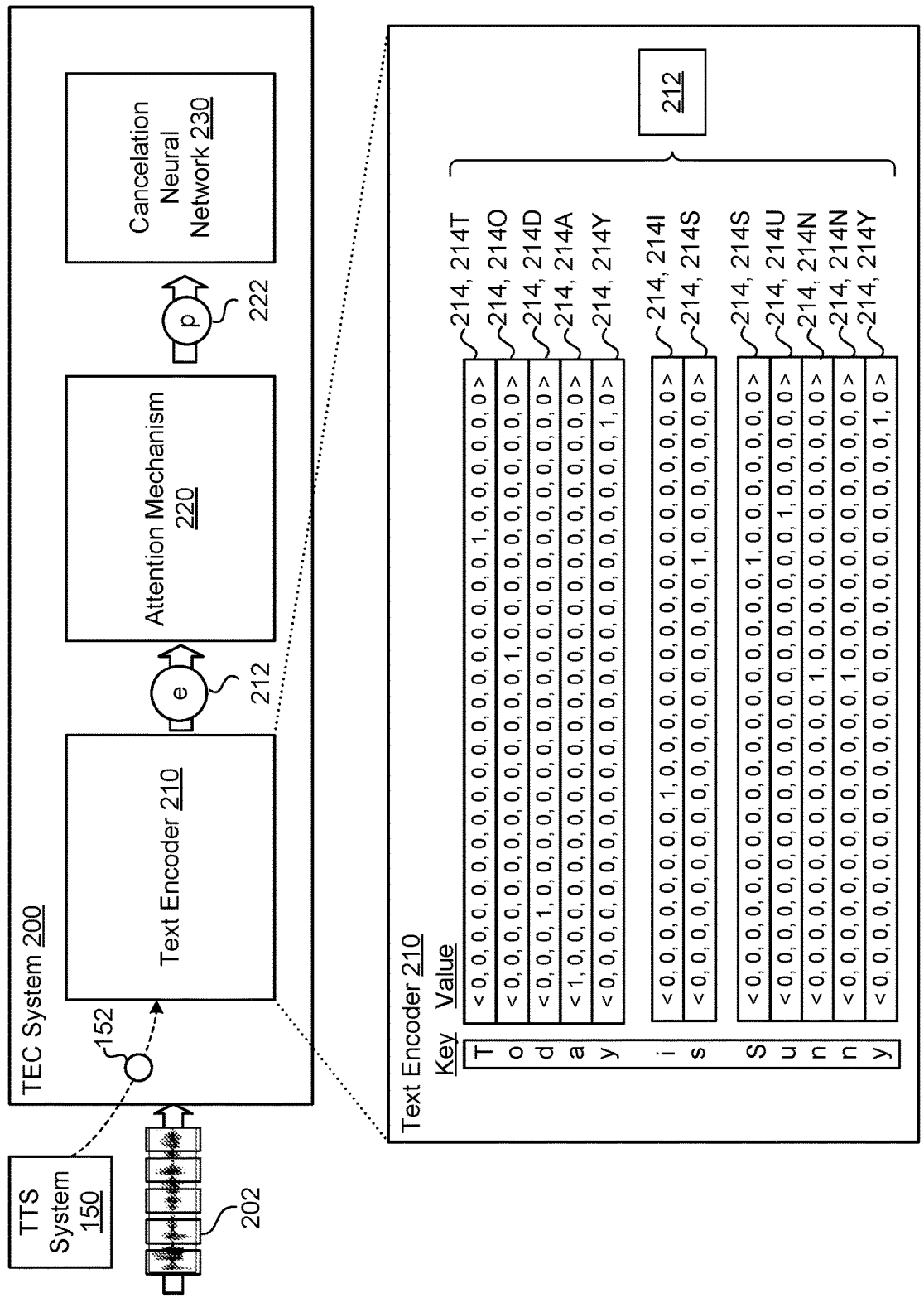

Referring to FIG. 2B, the text embedding 212 is a sequence of character embeddings 214 where each letter of the text 152 is represented by a twenty-six dimension vector. In other words, here, each dimension of the vector is assigned to a letter of the English alphabet. In this example, the text 152, "today is sunny," is fourteen characters (including spaces) and based on this, the text encoder 210 generates a text embedding 212 that is a sequence of fourteen character embeddings 214. To illustrate, the character embedding 214 for each letter in the text 152 includes a value at its position in the alphabet. For instance, the letter "T" is the $20^{th}$ letter in the English alphabet and the character embedding 214T for the letter "T" of the text 152 of the synthesized playback audio 154, "today is sunny," is a vector where the $20^{th}$ dimension in the vector includes a value (e.g., shown as a "1") designating that the character is a "T." The letter "O" is the $15^{th}$ letter of the alphabet and includes a value of one at the $15^{th}$ dimension of the character embedding for the letter "O." The letter "D" is the $4^{th}$ letter of the alphabet and includes a value of one at the $4^{th}$ dimension of the character embedding for the letter "D." The letter "A" is the $1^{st}$ letter of the alphabet and includes a value of one at the $1^{st}$ dimension of the character embedding for the letter "A." The letter "Y" is the $25^{th}$ letter of the alphabet and includes a value of one at the $25^{th}$ dimension of the character embedding for the letter "Y." The letter "I" is the $9^{th}$ letter of the alphabet and includes a value of one at the $9^{th}$ dimension of the character embedding for the letter "I." The letter "S" is the $19^{th}$ letter of the alphabet and includes a value of one at the $19^{th}$ dimension of the character embedding for the letter "S." The letter "U" is the $21^{st}$ letter of the alphabet and includes a value of one at the $21^{st}$ dimension of the character embedding for the letter "U." The letter "N" is the $14^{th}$ letter of the alphabet and includes a value of one at the $14^{th}$ dimension of the character embedding for the letter "N."

The attention mechanism 220 is configured to receive the text embedding 212 (e.g., the sequence of character embeddings 214) and to determine a cancelation probability 222 that indicates a likelihood that a character associated with text 154 corresponding to the synthesized playback audio 154 is within the overlapping region 204. In other words, the attention mechanism 220 may determine a corresponding cancelation probability 222 for each character embedding 214 in the sequence of character embeddings 214 output from the text encoder 212. With this cancelation probability 222, the network 230 may focus on removing portions of the synthesized playback audio 154 to generate the enhanced audio signal 206. Stated differently, an attention mechanism (e.g., the attention mechanism 220) may correspond to an alignment model (e.g., a location-sensitive model) that is configured to enable a neural network (e.g., the network 230) to focus on particular components of an input (e.g., the audio signal 202) to the neural network (e.g., the network 230). Here, the attention mechanism 220 directs the network 230 to a position (i.e., the overlapping region 204) within the audio signal 202 that requires echo cancelation. By using the attention mechanism 220, the TEC system 200 may understand the alignment of where the text 152 of the synthesized playback audio 154 occurs within the audio signal 202. In other words, when the TEC system 200 only receives the text 152 corresponding to the synthesized playback audio 154 and the audio signal 202, the TEC system 200 (specifically the cancelation neural network 230) does not have any knowledge of what portions of the text 152 correspond to synthesized playback audio 154 occurring within the overlapping region 204 of the audio signal 202. Therefore, to understand where the echo 156 from the synthesized playback audio 154 mixes with the speech utterance 12 in the audio signal 202, the TEC system 200 may use the attention mechanism 220.

Figure 2C:
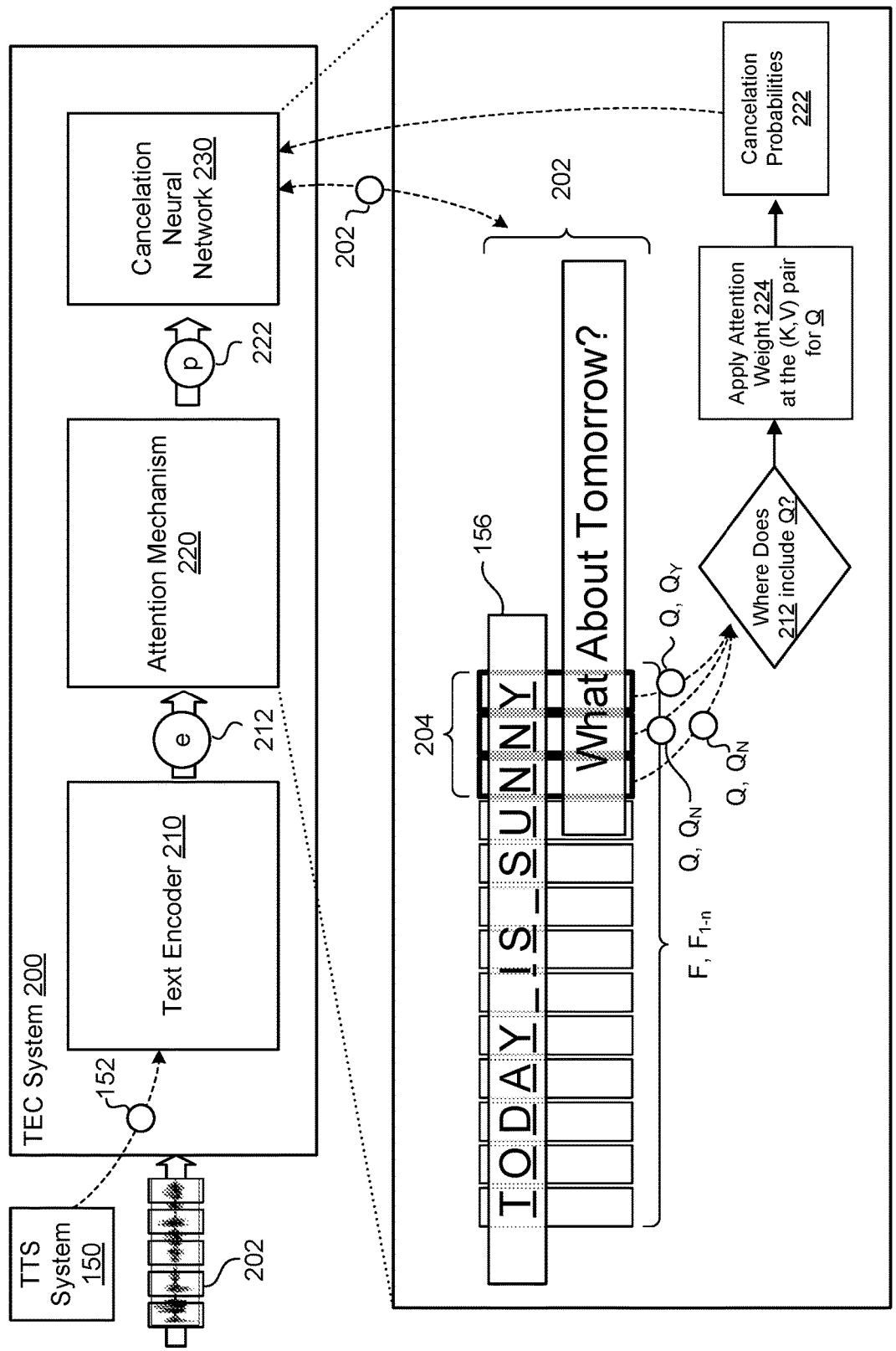
Figure 2D:
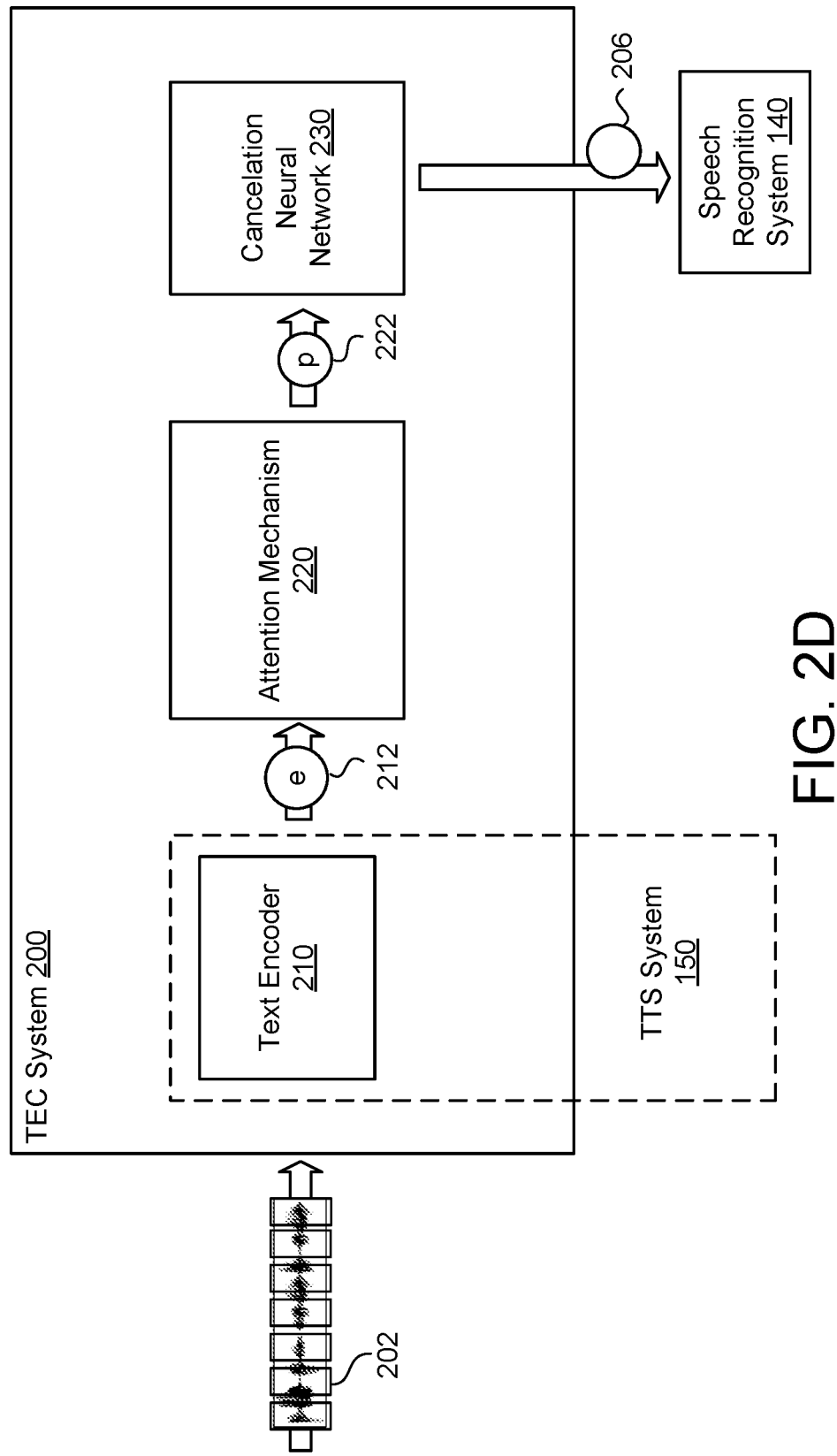
FIG. 2D is a schematic view of an example textual echo cancelation system sharing a text encoder with a text-to-speech system.

In some examples, the attention mechanism 220 determines the cancelation probability 222 by stepping through each frame F of the audio signal 202. Here, the audio signal 202 includes a plurality of frames F, $F_{1-n}$ dividing the audio signal into 202 into segments as shown in FIG. 2C. For each frame F, the attention mechanism 220 determines whether, at that frame F, the echo 156 from the synthesized playback audio 154 overlaps with the utterance 12. As shown in FIG. 2C, the attention mechanism identifies three frame F corresponding to the overlapping region 204 where the echo 156 from the synthesized playback audio 154 overlaps with the utterance 12. In some configurations, when the attention mechanism 220 identifies the one or more frames F of the overlapping region 204, the attention mechanism 220 identifies/determines the one or more characters of the text 152 (e.g., shown as the characters "nny" of the word "sunny") corresponding to the synthesized playback audio 154 for each frame F in the overlapping region 204. With the specific characters of the text 152, the attention mechanism 220 generates a corresponding query Q (e.g., shown as three queries Q, $Q_N$, $Q_N$, $Q_Y$) for each identified character that queries the text embedding 212 to identify the value (e.g., one or more values represented by a character embedding vector) for the respective character. In other words, the function of the attention mechanism 220 operates to map a query Q to a set of key-value (K,V) pairs in order to generate the cancelation probability 222. Here, the key-value pairs (e.g., as shown in FIG. 2B) corresponds to a key for a character within the text 152 and the value of that key being the vector representation of the character embedding 214 for that particular character of the text 152. When the query Q identifies a character embedding 214 that corresponds to a character of the text 152 from a particular frame F, the attention mechanism 220 assigns a weight 224 to one or more values of the character embedding 214. By assigning these attention weights 224 based on each frame F of the overlapping region 204, the attention mechanism 220 forms a context vector defining the cancelation probabilities 222 for characters of the text 152. Here, to perform this functionality, the attention mechanism 220 may perform scaled dot-product attention or multi-headed attention. For instance, in some examples, the attention function of the attention mechanism 220 that assigns the weights 224 to represent the cancelation probability 222 is represented by the following equation:

$$\text{Attention}(Q, K, V) = \text{softmax}\left(\frac{QK^T}{\sqrt{d_k}}\right)V \quad (1)$$

where dk corresponds to the dimension of the key for the key-value pair.

The network 230 operates in conjunction with the attention mechanism 220 to generate the enhanced audio 206. In some implementations, the network 230 receives, as inputs, the audio signal 202, the text 154, and/or the cancelation probabilities 222 from the attention mechanism 220. With the cancelation probabilities 222, the network 230 is able to identify where in the audio signal 202 that the echo 156 from the synthesized playback audio 154 should be canceled or removed in order to modify the audio signal 202 to form the enhanced audio signal 206. In some examples, the network 230 is a long short-term memory (LSTM) network with a plurality of LSTM layers. For instance, the attention mechanism 220 may reside on one or more of these LSTM layers.

Figure 2E:
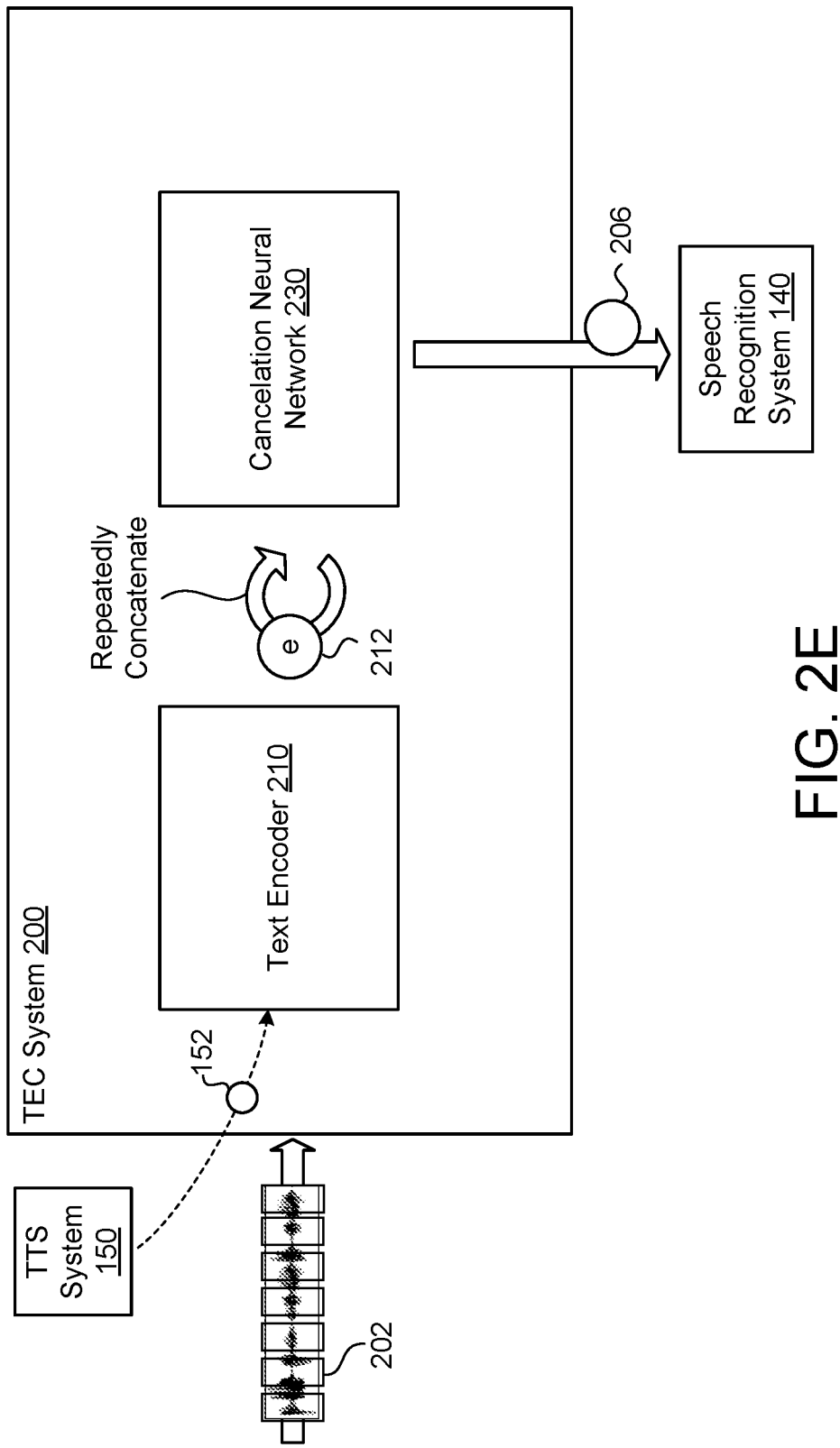
FIG. 2E is a schematic view of an example textual echo cancelation system without an attention mechanism.

FIG. 2E is an example of a TEC system 200 without an attention mechanism 220. In other words, the TEC system 200 includes the text encoder 210 and the network 230. Here, the text encoder 210 generates a text embedding 212 that is a single fixed-dimensional text embedding vector representing the entire text 152 corresponding to the synthesized playback audio 154. Here, the TEC system 200 repeatedly concatenates the fixed-dimensional text embedding 212 with the audio signal 202 for each frame F of the audio signal 202 at the network 230. By repeatedly concatenating the fixed-dimensional text embedding 212, the TEC system 200 functions similarly to the filtering system by identifying where to filter out the fixed-dimensional text embedding 212 when one or more frames F of the audio signal 202 resemble the fixed-dimensional text embedding 212. Although this process results in an enhanced audio signal 206, this process lacks the alignment identified by the attention mechanism 220 and demands continuous processing resources to perform the concatenation at the network 230.

Figure 3:
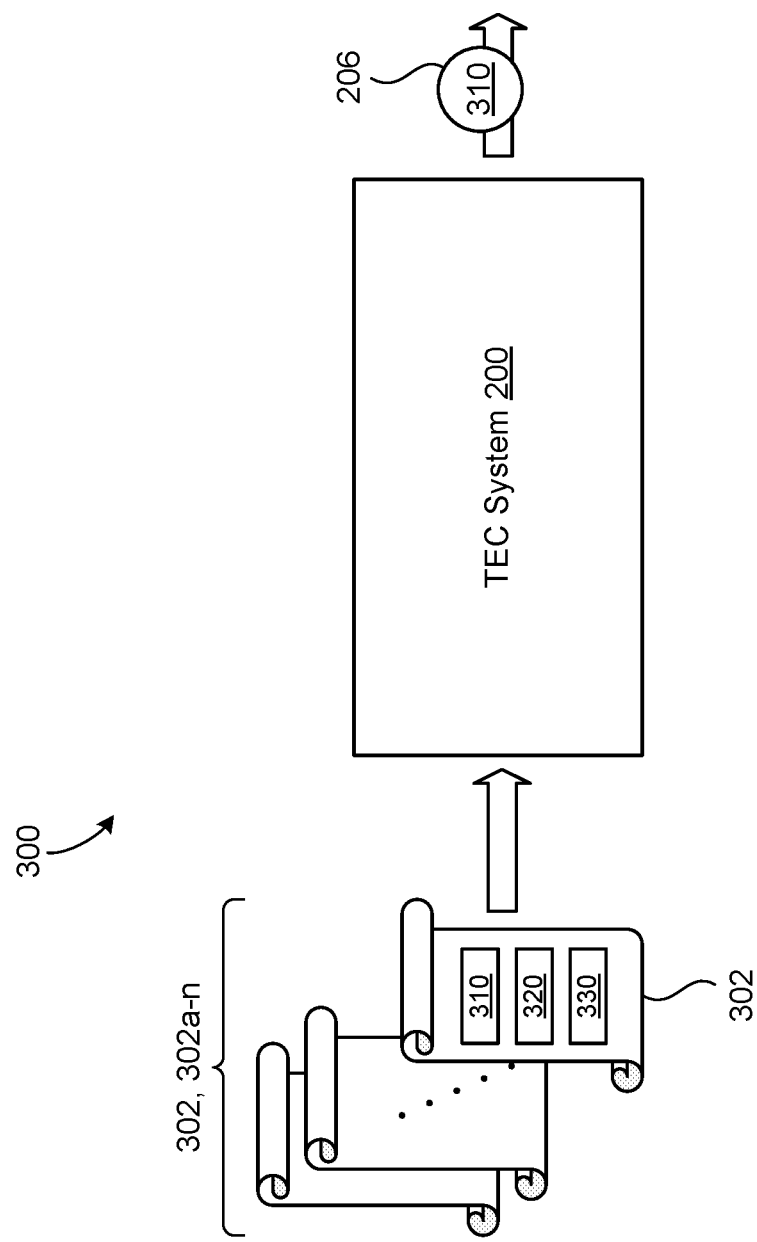
FIG. 3 is a schematic view of an example training process for training the textual echo cancelation system of FIG. 1.

Referring to FIG. 3, in some configurations, prior to implementation of the TEC system 200 (i.e., prior to inference), a training process 300 trains the TEC system 200 (e.g., the attention mechanism 220 and/or the network 230). The training process 300 trains the TEC system 200 using a plurality of training examples 302, 302a-n. Each example of the training examples 302 includes a ground truth audio signal 310 corresponding to non-synthesized speech (e.g., real speech samples spoken by human users), a training overlapped audio signal 320, and training text 330. Here, the training overlapped audio signal 320 includes the ground truth audio signal 310 overlapping (e.g., at least in some portion) with a synthesized audio signal 154 and the training text 330 corresponds to a textual representation of the synthesized audio signal 154 that overlaps with the ground truth audio signal 310. By using a plurality of training examples 302, the training process 300 teaches the TEC system 200 (e.g., the attention mechanism 220 and/or network 230) to learn how to generate the enhanced audio signal 206 output by the TEC system 200 during inference. In other words, the training process 300 teaches the TEC system 200 to generate the ground truth audio signal 310 as the enhanced audio signal 206 based on the training overlapped audio signal 320 and the training text 330.

Figure 4:
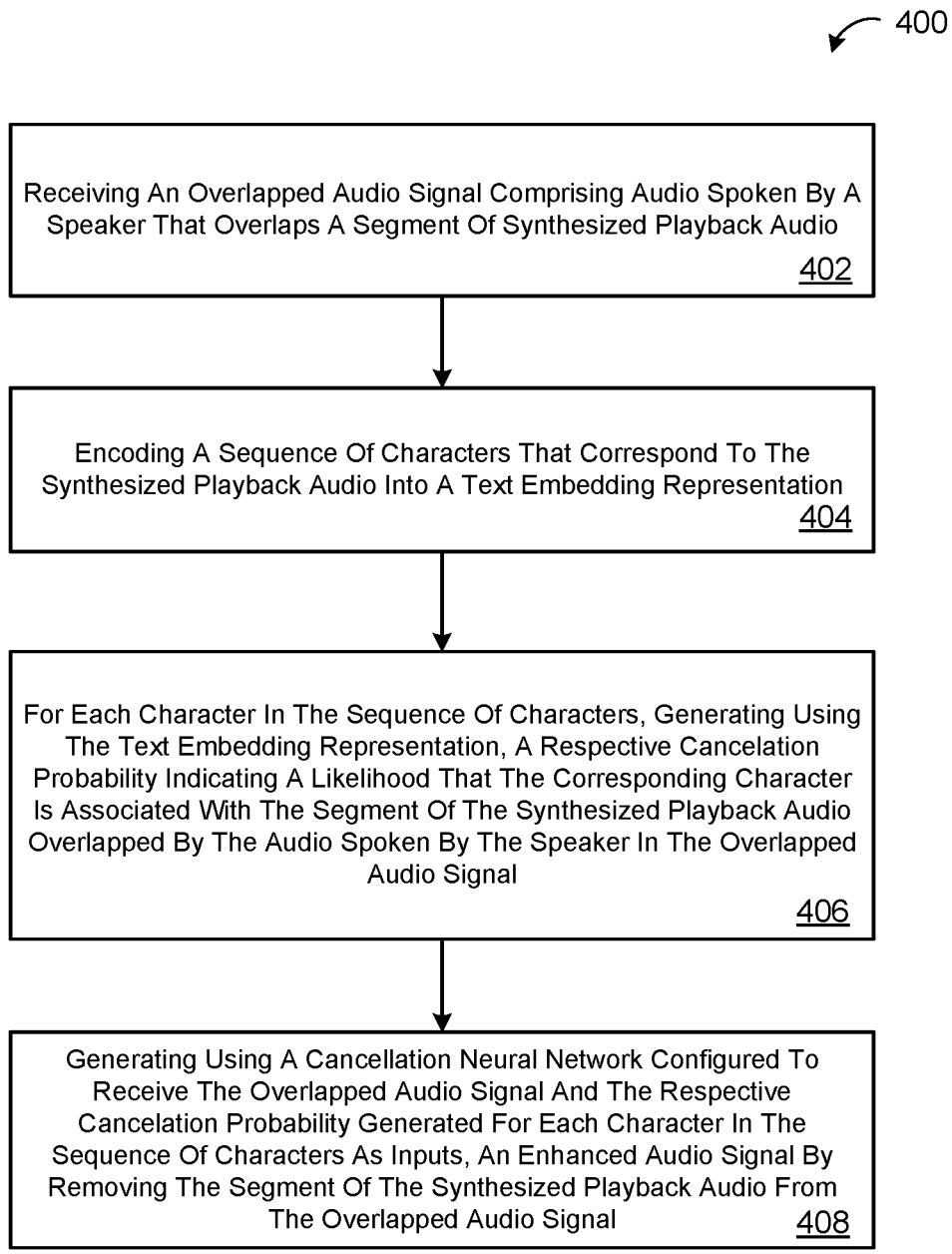
FIG. 4 is a flowchart of an example arrangement of operations for a method of generating an enhanced audio signal to cancel echo.

FIG. 4 is a flow chart of an example arrangement of operations for a method 400 of generating an enhanced audio signal 206 to cancel echo 156. At operation 402, the method 400 receives overlapped audio signal 202 including audio spoken (e.g., an utterance 12) by a speaker 10 that overlaps a segment of synthesized playback audio 154. At operation 404, the method 400 encodes a sequence of characters that correspond to the synthesized playback audio 154 into a text embedding representation 212. For each character in the sequence of characters, at operation 406, the method 400 generates, using the text embedding representation 212, a respective cancelation probability 222 indicating a likelihood that the corresponding character is associated with a segment of the synthesized playback audio 154 overlapped by the audio spoken by the speaker 10 (e.g., the utterance 12) and the overlapped audio signal 202. At operation 408, the method 400 generates an enhanced audio signal 206 using a cancelation network 230 configured to receive the overlapped audio signal 202 and the respective cancelation probability 222 generated for each character in the sequence of characters as inputs. The cancelation network 230 generates the enhanced audio signal 206 by removing the segment of the synthesized playback audio 154 from the overlapped audio signal 202.

Figure 5:
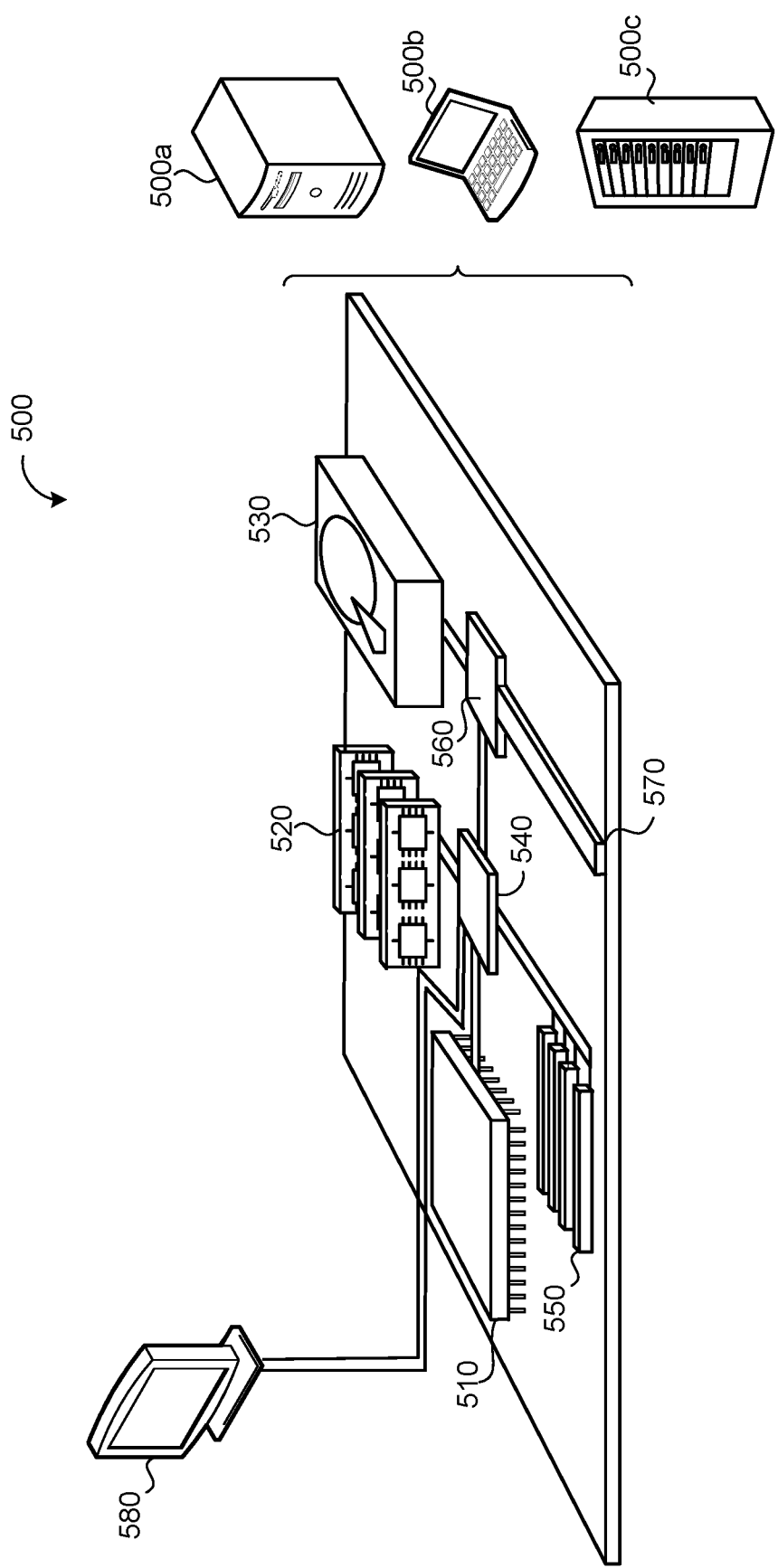
FIG. 5 is a schematic view of an example computing device that may be used to implement the systems and methods described herein.

FIG. 5 is schematic view of an example computing device 500 that may be used to implement the systems (e.g., systems 130, 140, 150, 160, 200) and methods (e.g., method 400) described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510 (e.g., data processing hardware), memory 520 (e.g., memory hardware), a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed on data processing hardware causes the data processing hardware to perform operations comprising:
    obtaining a plurality of training examples, each training example of the plurality of training examples comprising:
        a ground truth audio signal corresponding to non-synthesized speech;
        a training overlapped audio signal comprising the ground truth audio signal overlapping a synthesized audio signal; and
        training text comprising a respective sequence of characters representing the synthesized audio signal; and
    training a cancelation neural network on the plurality of training examples to teach the cancelation neural network to generate the ground truth audio signals based on the training overlapped audio signals and the training text.

2. The computer-implemented method of claim 1, wherein training the cancelation neural network comprises, for each training example of the plurality of training examples:
    encoding the respective sequence of characters that represent the synthesized audio signal into a text embedding representation;
    for each character in the respective sequence of characters, generating, using the text embedding representation, a respective cancelation probability indicating a likelihood that the corresponding character is associated with a segment of the synthesized audio signal overlapped by the ground truth audio signal in the training overlapped audio signal; and
    teaching, based on the cancelation neural network receiving the training overlapped audio signal and the respective cancelation probability generated for each character in the respective sequence of characters as inputs, the cancelation neural network to generate the ground truth audio signal by removing the segment of the synthesized audio signal from the training overlapped audio signal.

3. The computer-implemented method of claim 2, wherein the text embedding representation comprises a single, fixed-dimensional text embedding vector.

4. The computer-implemented method of claim 2, wherein the text embedding representation comprises a length corresponding to a number characters in the respective sequence of characters.

5. The computer-implemented method of claim 2, wherein encoding the respective sequence of characters comprises encoding each character in the respective sequence of characters into a corresponding character embedding to generate a sequence of character embeddings.

6. The computer-implemented method of claim 5, wherein:
    the training overlapped audio signal comprises a sequence of frames, each frame in the sequence of frames corresponding to a portion of the ground truth audio signal that overlaps the segment of synthesized audio signal; and
    generating the respective cancelation probability for each character in the respective sequence of characters comprises using an attention mechanism to apply a weight to the corresponding character embedding when the corresponding character embedding corresponds to one of the frames in the sequence of frames of the training overlapped audio signal.

7. The computer-implemented method of claim 1, wherein a text encoder of a text encoding neural network encodes the respective sequence of characters that correspond to the synthesized audio signal into the text embedding representation.

8. The computer-implemented method of claim 7, wherein the text encoder is shared by a text-to-speech (TTS) system, the TTS system configured to generate the synthesized audio signal from the respective sequence of characters.

9. The computer-implemented method of claim 1, wherein the cancelation neural network comprises a Long Short Term Memory (LSTM) network with a plurality of LSTM layers.

10. The computer-implemented method of claim 1, wherein a text-to-speech (TTS) system converts the respective sequence of characters into synthesized speech comprising the synthesized audio signal.

11. A system comprising:
   data processing hardware; and
   memory hardware in communication with the data processing hardware, the memory hardware storing instructions that when executed on the data processing hardware cause the data processing hardware to perform operations comprising:
      obtaining a plurality of training examples, each training example of the plurality of training examples comprising:
         a ground truth audio signal corresponding to non-synthesized speech;
         a training overlapped audio signal comprising the ground truth audio signal overlapping a synthesized audio signal; and
         training text comprising a respective sequence of characters representing the synthesized audio signal; and
      training a cancelation neural network on the plurality of training examples to teach the cancelation neural network to generate the ground truth audio signals based on the training overlapped audio signals and the training text.

12. The system of claim 11, wherein training the cancelation neural network comprises, for each training example of the plurality of training examples:
   encoding the respective sequence of characters that represent the synthesized audio signal into a text embedding representation;
   for each character in the respective sequence of characters, generating, using the text embedding representation, a respective cancelation probability indicating a likelihood that the corresponding character is associated with a segment of the synthesized audio signal overlapped by the ground truth audio signal in the training overlapped audio signal; and
   teaching, based on the cancelation neural network receiving the training overlapped audio signal and the respective cancelation probability generated for each character in the respective sequence of characters as inputs, the cancelation neural network to generate the ground truth audio signal by removing the segment of the synthesized audio signal from the training overlapped audio signal.

13. The system of claim 12, wherein the text embedding representation comprises a single, fixed-dimensional text embedding vector.

14. The system of claim 12, wherein the text embedding representation comprises a length corresponding to a number characters in the respective sequence of characters.

15. The system of claim 12, wherein encoding the respective sequence of characters comprises encoding each character in the respective sequence of characters into a corresponding character embedding to generate a sequence of character embeddings.

16. The system of claim 15, wherein:
   the training overlapped audio signal comprises a sequence of frames, each frame in the sequence of frames corresponding to a portion of the ground truth audio signal that overlaps the segment of synthesized audio signal; and
   generating the respective cancelation probability for each character in the respective sequence of characters comprises using an attention mechanism to apply a weight to the corresponding character embedding when the corresponding character embedding corresponds to one of the frames in the sequence of frames of the training overlapped audio signal.

17. The system of claim 11, wherein a text encoder of a text encoding neural network encodes the respective sequence of characters that correspond to the synthesized audio signal into the text embedding representation.

18. The system of claim 17, wherein the text encoder is shared by a text-to-speech (TTS) system, the TTS system configured to generate the synthesized audio signal from the respective sequence of characters.

19. The system of claim 11, wherein the cancelation neural network comprises a Long Short Term Memory (LSTM) network with a plurality of LSTM layers.

20. The system of claim 11, wherein a text-to-speech (TTS) system converts the respective sequence of characters into synthesized speech comprising the synthesized audio signal.

* * * * *